(12) United States Patent
Ishikawa et al.

(10) Patent No.: US 7,372,222 B2
(45) Date of Patent: *May 13, 2008

(54) CONTROL DEVICE FOR MOTOR-DRIVEN 4WD VEHICLE AND RELATED CONTROL METHOD

(75) Inventors: Yasuki Ishikawa, Tokyo (JP); Wataru Takanami, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 456 days.

This patent is subject to a terminal disclaimer.

(21) Appl. No.: 10/995,317

(22) Filed: Nov. 24, 2004

(65) Prior Publication Data

US 2005/0117423 A1    Jun. 2, 2005

(30) Foreign Application Priority Data

Nov. 27, 2003   (JP)   ............................. 2003-397242

(51) Int. Cl.
*H02P 3/00*   (2006.01)
(52) U.S. Cl. ..................... 318/139; 318/442; 290/5; 290/10; 290/27
(58) Field of Classification Search ........... 318/139, 318/727, 442; 290/5, 10, 11, 14, 27
See application file for complete search history.

(56) References Cited

U.S. PATENT DOCUMENTS

| | | | |
|---|---|---|---|
| 4,616,166 A * | 10/1986 | Cooper et al. ............... 318/712 |
| 5,942,818 A * | 8/1999 | Satoh et al. ................... 310/46 |
| 5,969,624 A * | 10/1999 | Sakai et al. ............... 340/636.1 |
| 6,590,360 B2 | 7/2003 | Hirata et al. |
| 6,806,671 B2 | 10/2004 | Kusaka et al. |
| 6,938,713 B1 | 9/2005 | Tahara et al. |
| 7,119,513 B2 | 10/2006 | Ishikawa |
| 7,157,869 B2 | 1/2007 | Ishikawa |
| 2003/0146726 A1* | 8/2003 | Ishikawa et al. ............. 318/442 |
| 2005/0103550 A1 | 5/2005 | Ishikawa |

FOREIGN PATENT DOCUMENTS

| | | |
|---|---|---|
| EP | 1 236 603 A2 | 9/2002 |
| JP | 09-209790 A | 8/1997 |
| JP | 2002-152911 A | 5/2002 |
| JP | 2002-200932 A | 7/2002 |

(Continued)

OTHER PUBLICATIONS

U.S. Appl. No. 10/995,348, filed Nov. 24, 2004, Ishikawa et al.

*Primary Examiner*—Rina Duda
(74) *Attorney, Agent, or Firm*—Foley & Lardner LLP

(57) ABSTRACT

A control device for a motor-driven 4WD (four-wheel-drive) vehicle includes a 42v alternator (motor-generator) driven by an engine to generate three-phase AC power with 42 volts, a step-up and step-down inverter rectifying and stepping down three-phase AC power, generated by the 42v alternator, to DC power with 14 volts, and a 14V battery supplied with and charged with DC power with 14 volts outputted from the step-up and step-down inverter. A diode bridge circuit rectifies AC power with 42 volts, generated by the 42V alternator, to DC power by which a motor is rotationally driven to render the vehicle operative in 4WD drive mode.

11 Claims, 6 Drawing Sheets

FOREIGN PATENT DOCUMENTS

| | | |
|---|---|---|
| JP | 2003-102181 A | 4/2003 |
| JP | 2003-326991 A | 11/2003 |
| JP | 2005-130597 A | 5/2005 |
| JP | 2005-151685 A | 6/2005 |
| JP | 2005-151686 A | 6/2005 |
| JP | 2005-151687 A | 6/2005 |
| WO | WO 01/21431 A1 | 3/2001 |

* cited by examiner

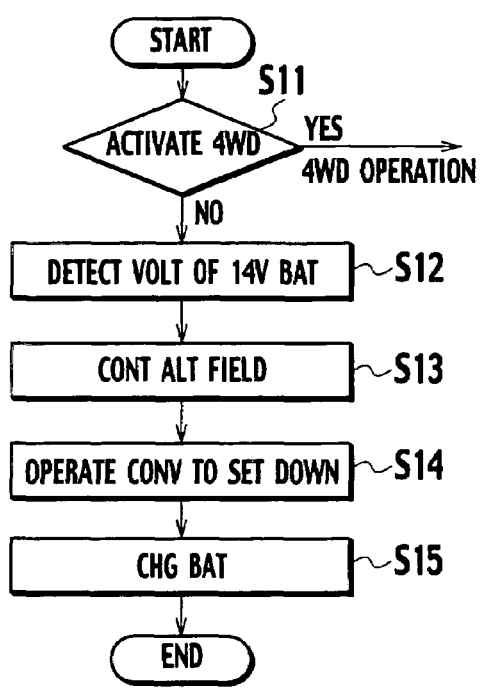
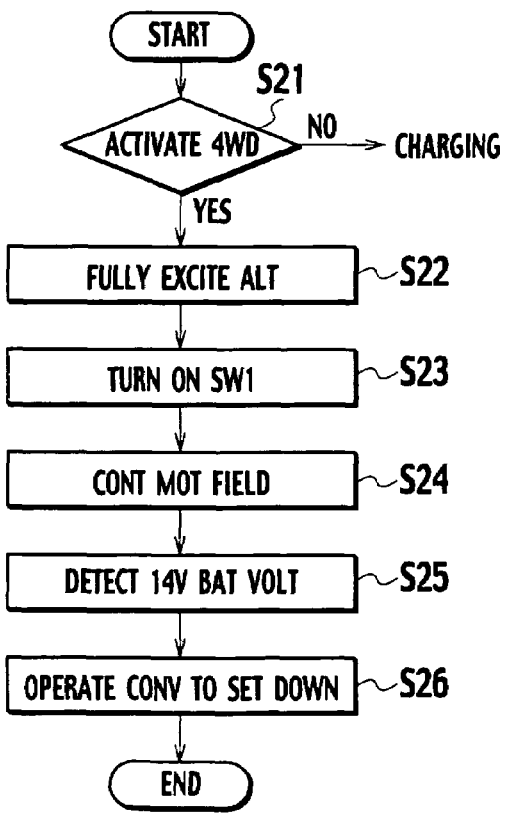

FIG. 5

| MODE | ALT | INV | BAT | SW1 | MOT M1 | OPERATION |
|---|---|---|---|---|---|---|
| ENG START | MOT | PWR | DISCH | OFF | STOP | • DRIVE ALT WITH INV AND START ENG |
| BAT CHG | ALT | REGEN | CHG | OFF | STOP | • GENERATE WITH ALT (WITH WEAKENED FIELD)<br>• REGENERATE WITH INV AND CHG BAT |
| 4WD | ALT | STOP | STOP CHG | ON | DR | • GENERATE WITH ALT<br>• CONV AC PWR TO DC PWR WITH DIODE AND DRIVE MOT |

FIG. 7

| MODE | ALT | INV | BAT | SW3 | SW1 | MOT M1 | OPERATION |
|---|---|---|---|---|---|---|---|
| ENG START | MOT | PWR | DISCH | ON | OFF | STOP | • DRIVE ALT WITH INV AND START ENG |
| BAT CHG | ALT | REGEN | CHG | ON | OFF | STOP | • GENERATE WITH ALT (WITH WEAKENED FIELD)<br>• REGENERATE WITH INV AND CHG BAT |
| 4WD | ALT | STOP | STP CHG | OFF | ON | DR | • GENERATE WITH ALT<br>• CONV AC PWR TO DC PWR WITH DIODE AND DRIVE MOT |

CONTROL DEVICE FOR MOTOR-DRIVEN 4WD VEHICLE AND RELATED CONTROL METHOD

BACKGROUND OF THE INVENTION

1. Field of the Invention

The present invention relates to a control device and related control method for a motor-driven 4WD (four-wheel-drive) vehicle wherein either of front wheels and rear wheels are available to be driven by an engine and the others are available to be driven by a motor.

2. Description of the Related Art

In the related art 4WD vehicles have heretofore been known wherein front wheels are driven with a drive power, generated buy an engine, by which an electric power generator is driven to generate electric power which in turn rotationally drives a motor to provide a drive power by which rear wheels are driven (see Japanese Patent Laid Open Publication Nos. 2002-152911 and 2002-200932).

SUMMARY OF THE INVENTION

However, with such related art vehicles, since an electric power generator for driving wheels, and an electric power generator for supplying electric power to an electrical equipment of a vehicle are separately equipped, the number of component parts increases, causing an issue of restriction in layout. Also, the increase in the number of component parts results in an increase in weight of the vehicle, causing an issue of an increase in costs.

The present invention has been made to address the above issues encountered in the related art and has an object to provide a control device and control method, for a motor-driven 4WD vehicle, which are able to simplify a device structure.

To achieve the above object, one aspect of the present invention provides a control device for a motor-driven 4WD vehicle wherein either one of front wheels or rear wheels are driven by an engine and the others are driven by a motor depending upon needs, comprising: a motor-generator driven by the engine to generate first electric power with a first rated voltage; a set-up and set-down inverter setting down the first electric power to second electric power with a second rated voltage lower than the first rated voltage; and an electrical equipment supplied with the second electric power outputted from the set-up and set-down inverter, wherein the motor is driven with the first electric power outputted from the motor-generator.

To achieve the above object, another aspect of the present invention provides a method of controlling a motor-driven 4WD vehicle wherein either one of front wheels or rear wheels are driven by an engine and the others are driven by a motor depending upon needs, the method comprising: causing a set-up and set-down inverter to rectify and set down first electric power with a first rated voltage generated by a motor-generator to second electric power with a second rated voltage lower than the first rated voltage for supplying the second electric power to an electric equipment mounted on a vehicle; and causing the set-up and set-down inverter to set up third electric power with a third rated voltage generated by the electric equipment to fourth electric power with a fourth rated voltage higher than the third rated voltage and convert to the fourth electric power to fifth electric power with a fifth rated voltage thereby supplying the fifth electric power to the motor so that performing 4WD drive.

BRIEF DESCRIPTION OF THE DRAWINGS

FIG. 3 is a flowchart illustrating a basic sequence of operations of the control device, of the motor-driven 4WD vehicle of the presently filed embodiment, during a 14V-battery charging mode;

FIG. 4 is a flowchart illustrating a basic sequence of operations of the control device, of the motor-driven 4WD vehicle of the presently filed embodiment, during a 4WD drive mode;

FIG. 5 is a table illustrating operating conditions of various component parts forming the control device of the motor-driven 4WD vehicle of the first embodiment;

FIG. 7 is a table illustrating operating conditions of various component parts forming the control device of the motor-driven 4WD vehicle of the second embodiment.

DETAILED DESCRIPTION OF INVENTION

Hereinafter, various embodiments according to the present invention are described with suitable reference to the accompanying drawings;

First Embodiment

Figure 1:
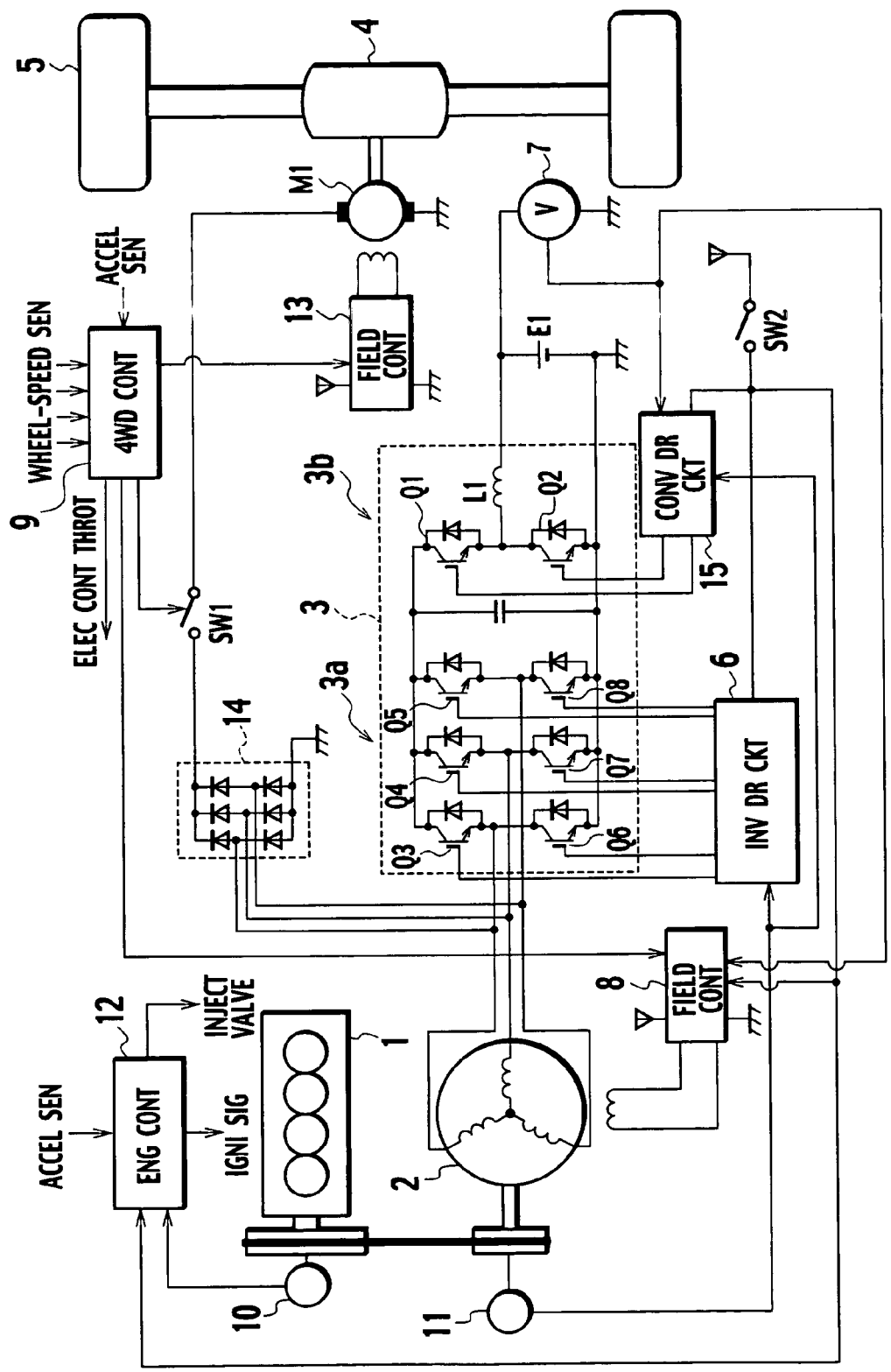
FIG. 1 is a block diagram illustrating a structure of a control device for a motor-driven 4WD vehicle of a fist embodiment according to the present invention.

A control device of a first embodiments serves to control a vehicle with a structure wherein either of the front wheels or rear wheels are driven with an engine and the others are driven with a motor. As shown in FIG. 1, the vehicle is comprised of an engine 1, a 42V alternator (motor-generator) (ALT) 2 connected to the engine 1 through a belt to transmit rotational power of the engine 1 to generate AC power (e.g., three-phase AC power) at 42V (a first rated voltage) and operative to serve as an electric motor during engine start-up, a diode bridge circuit 14 (rectifying means) that rectifies AC power generated by the 42V alternator 2, a step-up and step-down inverter 3, and a 14V battery (electrical equipment) (BAT) E1 that supplies driving electric power to a variety of instrumented equipments installed on a vehicle.

Furthermore, the vehicle is comprised of a DC motor (MOT) M1 that is supplied with DC power, rectified by the diode bridge circuit 14, to be rotationally driven, a differential gear 4 connected to an output shaft of the motor M1, and rear wheels 5 rotationally driven with drive power of the motor M1. Also, while the presently filed embodiment will be described below with reference to an exemplary case where the engine 1 drives the front wheels whereas the motor M1 drives the rear wheels, it will be appreciated that if the engine 1 drives the rear wheels, the motor M1 comes to drive the front wheels.

Additionally, the control device is comprised of an engine controller (ENG CONT) 12 that controls driving conditions of the engine 1, an engine speed sensor 10 that detects rotational speed of the engine 1, a field control section (FIELD CONT) 8 for controlling electric current flowing across a field winding of the motor M1, a position sensor 11 for detecting a rotator position of the 42V alternator 2, a field control section (FIELD CONT) 13 that controls field current flowing across the field winding of the motor M1, and a voltage sensor 7 for detecting a charging voltage of the 14V battery E1.

The step-up and step-down inverter 3 includes an inverter section 3a composed of switching elements Q3 to Q8 such as six pieces of IGBTs or MOS-FETs, and a converter section 3b composed of switching elements Q1, Q2 and a coil L1. With the respective switching elements Q3 to Q8 controllably turned on or turned off, the inverter section 3a converts three-phase AC power (first electric power with a first rated voltage) (Maximum power: approximately 4 kW, Voltage: 11 Vrms to 42 Vrms), generated by the 42V alternator 2, to DC power and converts DC power (third electric power with a third rated voltage)(Maximum power: approximately 1 kW, Voltage: 14V), outputted from the converter section 3b, to three-phase AC power (fourth electric power with a fourth rated voltage) (Maximum power: approximately 1 kW, Voltage: 20 Vrms) that is supplied to the 42V alternator 2 for rotationally driving the same.

Further, the converter section 3b sets down the 42V DC power, outputted from the inverter section 3a, to 14V DC power (second electric power with a second rated voltage) (Maximum power: approximately 1 kW, Voltage: 14V) that is supplied to the 14V battery E1 for charging the same and sets up 14V DC power (the third electric power), outputted from the 14V battery E1, to 42V DC power to allow resulting set-up DC power to be supplied to the inverter section 3a.

Furthermore, included in the control device is a 4WD controller (4WD CONT) 9 that when the occurrence of slippage of the wheels is detected, controls 4WD drive in response to a detection signal of an accelerator sensor (ACCEL SENS) (not shown), which detects the amount of displacement of an accelerator pedal (not shown) installed on the vehicle, and a detection signal of a wheel-speed sensor (not shown). In performing 4WD drive, the 4WD controller 9 outputs control signals to field control sections 8, 13 and outputs a command signal for closing a switch SW1 connected between the diode bridge circuit 14 and the motor M1.

Additionally, the control device includes an inverter driver circuit (INV DR CKT) 6 that outputs ON/OFF signals to control input terminals of the respective switching elements Q3 to Q8 of the step-up and step-down inverter 3 in response to a detection signal of an accelerator switch (ACCEL SWITCH) SW2, which is turned on when the amount of displacement of the accelerator pedal detected by the accelerator sensor exceeds a given value (when a given condition is satisfied), and a rotor position signal of the 42V alternator detected by the position sensor 11, and a converter driver circuit (CONV DR CKT) 15 that outputs ON/OFF signals to control input terminals of the respective switching elements Q1, Q2 of the step-up and step-down inverter 3 in response to the detection signal of the accelerator switch SW2, the detection signal delivered from the position sensor 11 and the detection signal delivered from the voltage sensor 7.

Now, a basic sequence of operations of the control device of the motor-driven 4WD vehicle of the presently filed embodiment is described below in connection with (I) an engine start-up mode, (II) a charging mode of the 14V battery and (III) a 4WD drive mode. Also, respective operations of the 42V alternator 2, the step-up and step-down inverter 3, the 14V battery E1, the switch SW1 and the motor M1 in respective operating modes are collectively shown in FIG. 5.

(I) Operation in Engine Start-Up Mode (ENG START MODE)

Figure 2:
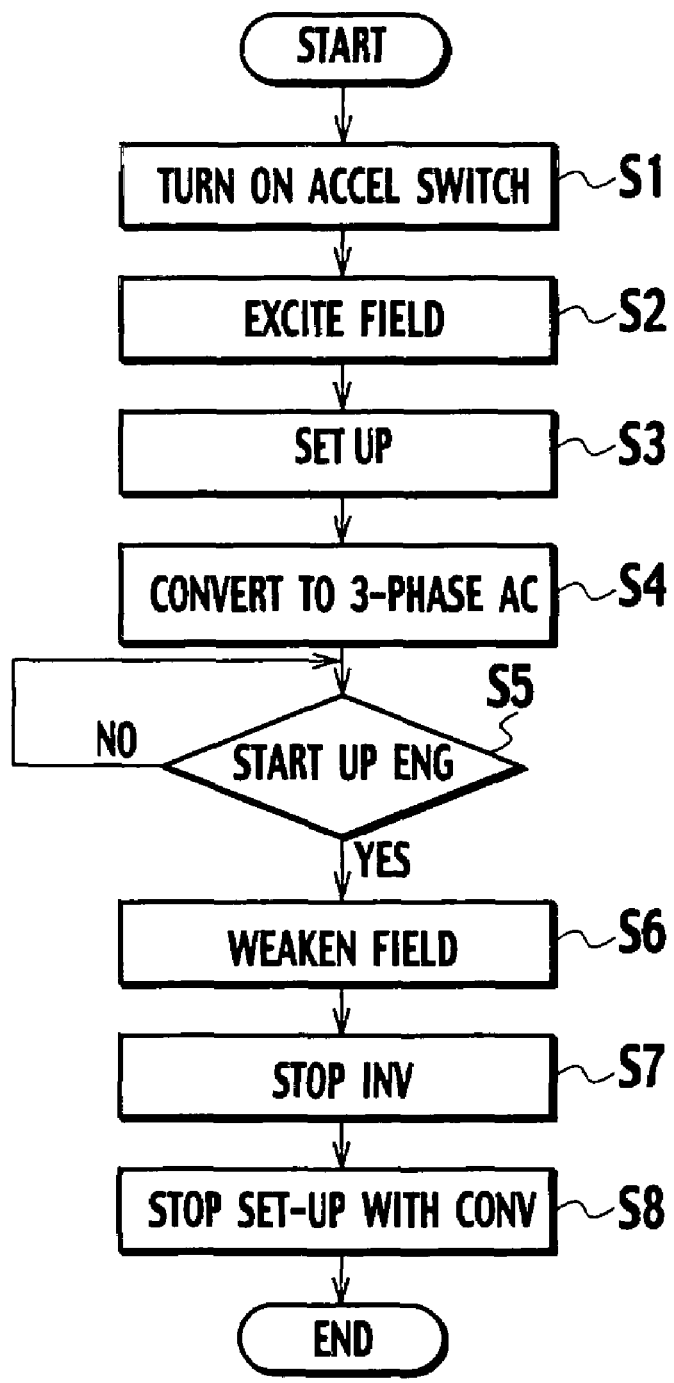
FIG. 2 is a flowchart illustrating a basic sequence of operations of the control device, of the motor-driven 4WD vehicle of the presently filed embodiment, during start-up of an engine.

Hereunder, description is made of operations in a start-up mode of the engine 1 with reference to a flowchart shown in FIG. 2. If the accelerator switch SW2 is turned on (step 1), under control of the inverter control circuit 6, a field command signal is applied to the field control section 8 to excite the field winding of the 42V alternator 2, rendering the alternator operative as the electric motor (step 2).

Next, the converter section 3b of the step-up and step-down inverter 3 is supplied with 14V DC power (the third electric power) discharged from the 14V battery E1 and under control of the converter driver circuit 15, the respective switching elements Q1, Q2 are controllably turned on or turned off. This allows 14V DC power (the third electric power) to be stepped up to 42V DC power that is outputted to the inverter section 3a (step 3).

Consecutively, under control of the inverter driver circuit 6, the respective switching elements Q3 to Q8 of the inverter section 3a are controllably turned on or turned off in synchronism with the detection signal delivered from the position sensor 11, thereby converting 42V DC power to three-phase 42V AC power (the fourth electric power) (step 4). Then, this three-phase AC power (the fourth electric power) is applied to the 42V alternator 2, which in turn is rotationally driven as the electric motor to rotationally drive the engine 1 connected to the alternator. In the meanwhile, the engine controller 12 allows fuel injections in synchronism with rotation of the engine 1 while initiating ignitions to start up the engine 1.

Subsequently, it is confirmed that the engine 1 has started up (step 5). Upon confirmation of the start-up of the engine 1, the field control section 13 controls field current to weaken the degree of excitation of the field winding of the 42v alternator 2 (step 6) and, thereafter, the operation of the inverter section 3a of the step-up and step-down inverter 3 is stopped (step 7). In step 8 concurrent with step 7, the operation of the converter section 3b is stopped.

Thus, the start-up operation of the engine 1 can be accomplished in phase with the occurrence of the accelerator switch S2 being turned on. Meanwhile, as shown in FIG. 5, during the operation (I) is operated, the battery E1 is discharged (DISCH), the step-up and step-down inverter 3 is operated in a power running mode (PWR), and the 42V alternator (ALT) 2 performs as a motor-generator (MOT).

(II) Operation in 14V. Battery Charging Mode (BAT CHG MODE)

Next, description is made of a basic sequence of operations in a charging mode of the 14V battery E1 with reference to the flowchart shown in FIG. 3.

First, the 4WD controller 9 is responsive to the detection signal of the accelerator sensor and the detection signal of the vehicle-wheel speed sensor to discriminate to find whether 4WD drive is available to be executed under a current status, that is, whether the motor M1 is available to be rotationally driven under the current status (step 11). If discrimination is made that 4WD drive is available, then, the operation proceeds to steps shown in FIG. 4.

If discrimination is made that no 4WD drive is available to be executed under the current status, a charged voltage of the 14V battery E1 is detected in response to the output signal of the voltage sensor 7 (step 12). Then, the field control section 8 controls field current flowing across the field winding of the 42V alternator 2 in response to the detection signal of the voltage sensor 7 so as to cause the 42V alternator 2 to generate electric power, and resulting three-phase AC power (the first electric power) is supplied to the inverter section 3a of the step-up and step-down inverter 3 by which three-phase AC power, which is generated, is rectified into 42V DC power (step 13).

Thereafter, the converter driver circuit 15 controllably turns on or turns off the respective switching elements Q1, Q2 of the converter section 3b, thereby converting 42V DC power to 14V DC power (the second electric power) (step 14). Using DC power, set down to 14 volts, allows the 14V battery E1 to be charged (step 15). When this takes place, the 14V battery E1 is charged at an appropriate voltage in response to the detection signal of the voltage sensor 7. Also, the 42V alternator 2 is excited at a level lower than a fully excited condition.

Thus, using three-phase AC power (the first electric power) generated by the 42V alternator 2 enables the battery E1 to be charged. Also, field current of the 42V alternator 2 is controlled in response to the detection signal of the voltage sensor 7 to control an output voltage of the 42V alternator 2, enabling reduction in power loss of the converter section 3b. Meanwhile, as shown in FIG. 5, during the operation (II) is operated, the step-up and step-down inverter 3 is operated in a regenerative mode (REGEN), and the 42V alternator 2 performs as an alternator (ALT).

(III) Operation in 4WD Drive (4WD MODE)

Next, description is made of basic sequence of operations in a 4WD drive mode with reference to a flowchart shown in FIG. 4. As mentioned above, the following operations will be executed when in step 11 in FIG. 3, discrimination is made that the 4WD drive mode is available to be executed.

If discrimination is made by the 4WD controller 9 in response to the detection signals delivered from the accelerator sensor and the vehicle-wheel sensor that 4WD drive needs to be executed (step 21), the 4WD controller 9 outputs a control command to the field control section 8 by which the field winding is fully excited to allow the 42V alternator 2 to provide the maximum power output (step 22). Then, the switch SW1 is turned on and the diode bridge circuit 14 and the motor M1 is brought into electrical connection (step 23).

Thereafter, the 4WD controller 9 outputs a control command signal to the field control section 13 to excite the field winding of the motor M1 to render the same operative to be rotationally driven (step 24).

As a result, 42V DC power (fifth electric power with a fifth rated voltage)(Maximum electric power: approximately 4 kW, Voltage: 16V to 60 V) rectified by the diode bridge circuit 14 is applied to the motor M1, which in turn is driven (DR in FIG. 5), and the rear wheels 5 are rotationally driven through the differential gear 4 to achieve 4WD drive.

Further, during the 4WD drive mode, if it is confirmed in response to the detection signal delivered from the voltage sensor 7 that the 14V battery E1 drops below a given charged voltage (step 25), three-phase AC power (the first electric power) resulting from the 42V alternator 2 is rectified by the inverter section 3a of the step-up and step-down inverter 3 (step 26) to allow DC power (the second electric power) to be supplied to the 14V battery E1 for charging the same. This enables the 14V battery E1 to be charged even during the 4WD drive mode if the charged voltage of the 14V battery E1 drops down to a given low level.

Thus, with the control device of the motor-driven 4WD vehicle of the presently filed embodiment, the use of electric power (the first electric power) generated by the 42V alternator 2 provides DC power (the second electric power) for charging the 14V battery E1 and electric power (the fifth electric power) for driving the motor M1, and no need arises for providing separate electric power generators for charging the battery and for driving the motor, enabling a device structure to be simplified. This enables improvement over a freedom in layout while enabling reduction in weight and costs.

That is, the use of only one motor-generator for supplying electric power to both a motor, to which electric power of a first rated voltage is supplied to be driven, and an electrical equipment to which electric power of a second rated voltage is supplied to be activated, enables the device structure to be simplified while providing improvement over a freedom in layout and enabling reduction in weight and costs.

Further, by operating the step-up and step-down inverter 3 to convert DC power (the third electric power), discharged from the 14V battery E1, to three-phase 42V AC power (the fourth electric power) that is supplied to the 42V alternator 2 to render the 42V alternator 2 operative as the electric motor to provide a rotational force by which the engine 1 is started up, no other power source is required for starting up the engine 1, enabling a device structure to be simplified.

That is, since electric power of the first rated voltage charged in the battery is converted to AC power of the second rated voltage with the step-up and step-down inverter to allow resulting AC power to be used for rotationally driving the motor-generator to provide a drive force to start up the engine, no need arises for providing other drive source to start up the engine, enabling a device structure to be simplified.

Moreover, with the accelerator switch SW2 turned on, the engine 1 is started up and an idle-stop mode can be realized, enabling improvement over fuel consumption.

That is, since the engine is started up when an occupant executes an acceleration operation as a given condition, an idle-stop mode can be realized. Additionally, with the idle-stop mode, the engine automatically stops when the car is stop, hence the fuel consumption can be improved.

Besides, due to an ability of the inverter section 3a of the step-up and step-down inverter 3 to rectify three-phase AC power (the first electric power) which is generated by the 42V alternator 2 to DC power (the second electric power) that is stepped down by the converter section 3b to allow resulting DC power (the second electric power) to be charged to the 14V battery E1, the 14V battery E1 can be supplied with charging power at all times when needed, enabling the 14V battery E1 to be kept at an appropriate charging voltage.

That is, since three-phase AC power, generated by the motor-generator, is rectified and stepped down by the step-up and step-down inverter to provide DC power for charging the battery, a charged voltage of the battery can be maintained at an appropriate voltage value at all times.

Further, since three-phase AC power generated by the 42V alternator 2 is rectified by the diode bridge circuit 14 to allow resultant DC power (the fifth electric power) to be supplied to the DC motor M1 with resultant rotational drive of the rear wheels 5, DC power for driving the motor M1 can be obtained without a need for complicated control, enabling to achieve simplified control operations. Also, with control operation simplified, erroneous operations can be reduced, enabling improvement over reliability in a motor-drive mode.

That is, since the rectifying means rectifies three-phase AC power, generated from the motor-generator (alternator), into DC power that is utilized to rotationally drive the DC motor for 4WD drive, DC power can be obtained without a need for complicated control, enabling control operations to be simplified.

Additionally, in cases where electric power, generated by the 42V alternator 2, is used only for charging the 14 battery E1 (that is, when no motor M1 is rotationally driven), the field control section 8 controls such that the 42V alternator 2 has a weakened field for thereby causing a drop in power output of the 42V alternator 2, enabling reduction in energy loss of the converter section 3b.

That is, when the battery is charged using electric power generated by the motor-generator while the motor is rendered inoperative, the output voltage generated by the motor-generator is controlled so as to lie at a voltage lower than that of the maximum power output, enabling reduction in energy loss of the step-up and step-down inverter.

Second Embodiment

Figure 6:
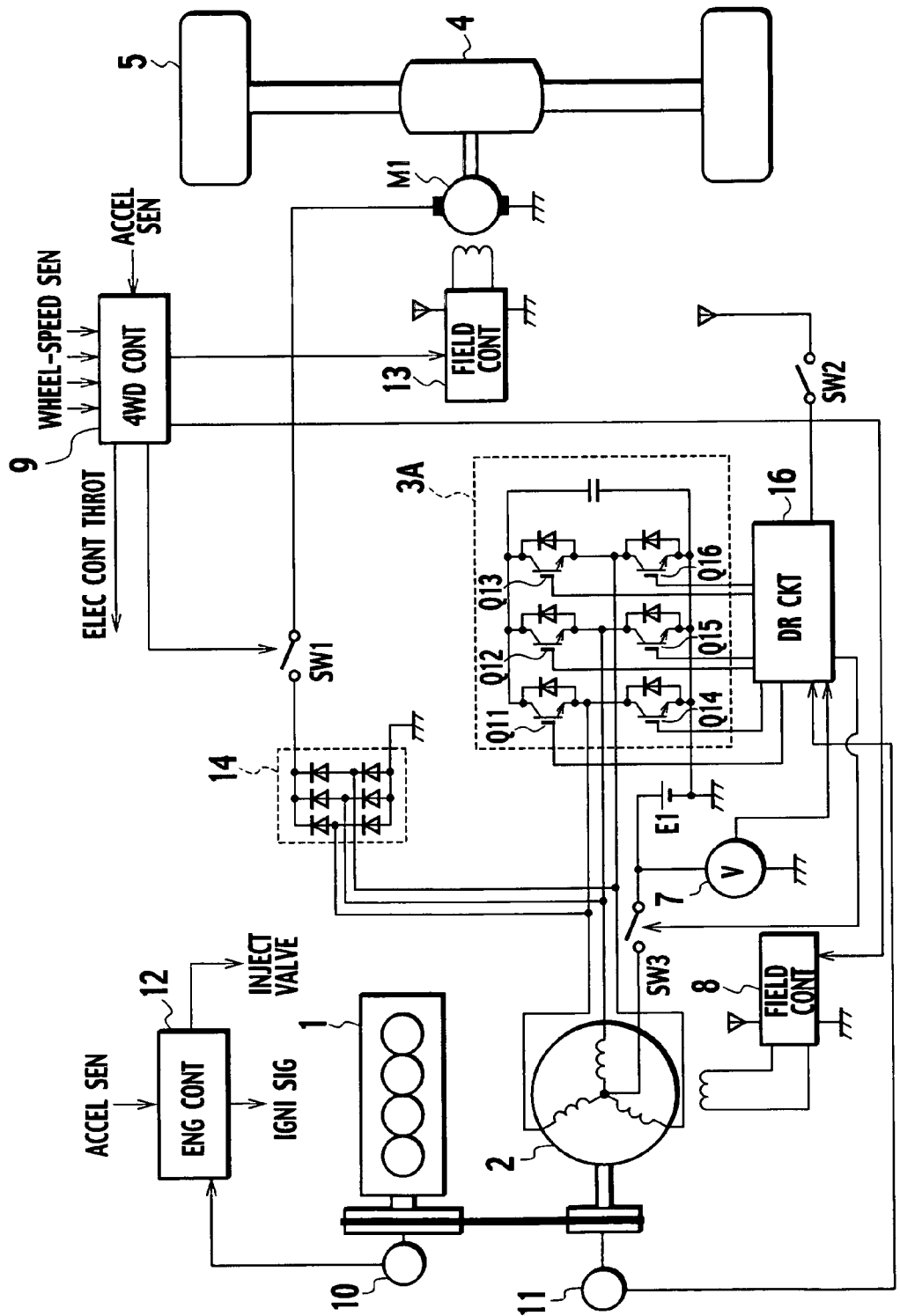
FIG. 6 is a block diagram illustrating a structure of a control device for a motor-driven 4WD vehicle of a second embodiment according to the present invention.

Next, description is made of a second embodiment according to the present invention. As shown in FIG. 6, a control device of the second embodiment is comprised of the engine 1, the 42V alternator (ALT) 2, a step-up and step-down inverter 3A, the diode bridge circuit 14, the motor M1 driven with DC power, a driver circuit (DR CKT) 16, the 14V battery E1 and the voltage sensor 7.

Further, the control device is comprised of the engine speed sensor 10 that detects rotational speed of the engine 1, the position sensor 11 for detecting the rotator position of the 42V alternator 2, the engine controller (ENG CONT) 12 for controlling the engine 1, the 4WD controller (4WD CONT) 9 that controls 4WD drive, the field control section 8 for controlling field current flowing across the field winding of the motor M1, and the field control section (FIELD CONT) 13 that controls field current flowing across the field winding of the motor M1.

A negative terminal of the 14V battery E1 is connected to a negative output terminal of the step-up and step-down inverter 3A and a positive terminal of the 14V battery E1 is connected to a neutral point of the 42V alternator 2 through a switch (switch means) SW3.

The step-up and step-down inverter 3A includes switching elements Q11 to Q16, such as IGBTs or MOS-FETs, which are controllably turned on or turned off for rectifying three-phase AC power (the first electric power with the first rated voltage) generated by the 42V alternator 2 while causing a voltage to be step down to provide charging electric power (the second electric power with the second rated voltage) that is supplied to the 14V battery E1 while, on the other hand, stepping up and converting DC power (the third electric power with the third rated voltage), discharged from the 14V battery E1, to three-phase 42V AC power (the fourth electric power with the fourth rated voltage) that is supplied to the 42V alternator 2.

The driver circuit 16 is responsive to the actuation signal of the accelerator switch SW2, the detection signal of the voltage sensor 7 and the detection signal of the position sensor 11 to execute control such that during engine start-up, with the switch SW3 turned on, the driver circuit 16 outputs the ON/OFF actuation signals to control input terminals of the switching elements Q11 to Q16 to perform operation in a power running mode wherein DC power (the third electric power), discharged from the 14V battery E1, is set up and converted to three-phase AC power (the fourth electric power). Also, with the switch SW3 turned on during the charging mode of the 14V battery E1, the driver circuit 16 controls so as to output the ON/OFF actuation signals to the control input terminals of the switching elements Q11 to Q16 to perform operation in a regenerative mode wherein three-phase AC power, generated by the 42V alternator 2, is rectified and set down to DC power that is charged to the 14V battery E1.

Now, a basic sequence of operations of the control device of the motor-driven 4WD vehicle of the second embodiment is described below. Also, the operations of the 42V alternator 2, the step-up and step-down inverter 3A, the 14V battery E1, the switches SW1, SW3 and the motor M1 in a engine start-up mode, a charging mode of the 14V battery and a 4WD drive mode are collectively shown in FIG. 7.

First, on describing the engine start-up mode, if the driver circuit 16 detects that the accelerator switch SW2 is turned on, the driver circuit 16 turns on the switch SW3 (in a closed state) under which the switching elements Q11 to Q16 of the step-up and step-down inverter 3A are controllably turned on or turned off to allow the step-up and step-down inverter 3A to operate in the power running mode.

This allows DC power (the third electric power), discharged from the 14V battery E1, to be set up and converted to three-phase AC power (the fourth electric power) that in turn is supplied to the 42V alternator 2, and the 42V alternator 2 is rotationally driven as the electric motor to provide a drive force that is transferred to the engine 1. This results in start-up of the engine 1.

Further, in charging the 14V battery E1, the switching elements Q11 to Q16 are controllably turned on or turned off with the switch SW3 turned on to allow the step-up and step-down inverter 3A to operate in the regenerative mode in which AC power, generated by the 42V alternator 2, is rectified and step down to 14V DC power (the third electric power) that is supplied to the 14 battery E1. When this takes place, a charged voltage is controlled so as to lie at an appropriate value in response to the detection signal of the voltage sensor 7. Thus, the 14V battery E1 is charged.

Further, if the 42V alternator 2 generates large power output, the switch SW3 is turned off (in an open state) to prevent excessive voltage from being supplied to the 14V battery E1, interrupting a supply of a voltage to the 14V battery E1.

On the other hand, in performing 4WD drive, the switch SW3 is turned off while the switch SW1 is turned on, and under a condition where the step-up and step-down inverter 3A is stopped, the field control section 13 permits field current to flow across the field winding of the motor M1. Then, the diode bridge circuit 14 rectifies three-phase AC power, generated by the 42V alternator 2, to DC power that is supplied to the motor M1, and the motor M1 is rotationally driven, thereby enabling the rear wheels 5 to be driven.

In such a way, with the control device for the motor-driven 4WD vehicle of the second embodiment, using electric power (the first electric power), generated by the 42V alternator 2, enables DC power (the second electric power) to be provided for charging the 14V battery E1 and electric power (the fifth electric power) to be provided for driving the motor M1 and no need arises for providing separate electric power generators for charging the 14V battery E1 and for driving the motor, enabling a device structure to be simplified. This allows improvement over a freedom in layout to achieve reduction in weight and costs.

Further, upon operation of the step-up and step-down inverter 3A to convert DC power (the third electric power), discharged from the 14V battery E1, to three-phase AC power (the fourth electric power) that is supplied to the 42V alternator 2, the 42V alternator 2 is rendered operative to be rotationally driven as the electric motor to allow resulting rotational drive force to start up the engine, resulting in no need for preparing other power source to start up the engine 1 for thereby enabling a device structure to be simplified.

Furthermore, with the switch SW2 turned on, the engine 1 is started up, thereby enabling an idle-stop mode to be realized while enabling improvement over fuel consumption.

Moreover, upon operation of the step-up and step-down inverter 3A to rectify and step down three-phase AC power (the first electric power), generated by the 42V alternator 2, to DC power (the second electric power) that is charged to the 14V battery E1, the 14V battery E1 can be supplied with charging power when needed, thereby enabling the 14V battery E1 to be kept at an appropriate charged voltage at all times.

In addition, the step-up and step-down inverter 3A rectifies and sets down three-phase AC power (the first electric power), generated by the 42V alternator 2, to DC power (the fifth electric power) that is supplied to the motor M1 to rotationally drive the motor M1 whereby the rear wheels 5 are rotationally driven, DC power can be obtained without a need for performing complicated control, enabling control operation to be simplified. Also, due to simplified control operation, erroneous operation is decreased, enabling improvement over reliability in operation during the motor drive mode.

Besides, with the 42V alternator 2 generating large power output, the switch SW3 is turned off, thereby preventing excessive voltage from being supplied to the 14V battery E1.

That is, if the electric power output of the motor-generator exceeds a given value (for example, 20 Vrms), turning off the switch means interrupts supply of electric power to the battery to prevent supply of excessive voltage to the battery, enabling protection for the battery.

As set fort above, while the control device for the motor-driven 4WD vehicle and the related control method according to the present invention have been described with reference to illustrated embodiments, the present invention is not limited to such particular applications and may take any alternative forms wherein respective component parts may be replaced with arbitrary structures with like functions.

While the embodiments set forth above have been described above with reference to exemplary structures wherein electrical equipment to be installed on the vehicle includes the battery, no limitation is intended by the present invention and electrical equipment may includes other loads. Also, the present invention has been described in conjunction with an example where the given condition under which the engine is started up is based on the turned-on condition of the accelerator switch, the present invention is not limited to such particular application and an alternative may include other conditions under which the engine is started up.

As already discussed above, although the present invention has been discussed in detail in conjunction with the embodiments, it will be appreciated by those skilled in the art that the present invention is not limited to the embodiments described in the present specification. It will be evident that various modifications or changes may be made to the device of the present invention without departing from the spirit and scope of the present invention defined by the appended claims. Accordingly, it is intended that the embodiments described be considered only as illustrative of the present invention and meant to have no limitation to the present invention.

The entire content of a Japanese Application No. P2003-397242 with a filing date of Nov. 27, 2003 is herein incorporated by reference.

Although the invention has been described above by reference to certain embodiments of the present invention, the invention is not limited to the embodiments described above and will occur to those skilled in the art, in light of the teachings. The scope of the invention is defined with reference to the following claims.

What is claimed is:

1. A control device for a motor-driven 4WD vehicle wherein either one of front wheels or rear wheels are driven by an engine and the others are driven by a motor depending upon needs, comprising:
    a motor-generator driven by the engine to generate a first electric power with a first rated voltage;
    a single step-up and step-down inverter for stepping down the first electric power to a second electric power with a second rated voltage lower than the first rated voltage; and
    an electrical equipment supplied with the second electric power outputted from the single step-up and step-down inverter, the electrical equipment including a battery, wherein
    the motor is driven with the first electric power with the first rated voltage outputted from the motor-generator,
    the single step-up and step-down inverter has
    a first function to cause the first electric power to be stepped down to the second electric power and
    a second function to cause a third electric power with a third rated voltage which is discharged from the battery to be stepped up to a fourth electric power with a fourth rated voltage higher than the third rated voltage.

2. The control device for the motor-driven 4WD vehicle according to claim 1, wherein
    the motor-generator has a function to generate a drive force in response to the fourth electric power outputted from the single step-up and step-down inverter, and wherein
    the engine is started up in response to the drive force generated by the motor-generator.

3. The control device for the motor-driven 4WD vehicle according to claim 2, wherein the third electric power is DC power, the fourth electric power is AC power, and wherein the single step-up and step-down inverter converts DC power to AC power.

4. The control device for the motor-driven 4WD vehicle according to claim 2, wherein the engine is started up when a condition is satisfied.

5. The control device for the motor-driven 4WD vehicle according to claim 4, wherein the condition includes an accelerator pedal operation to be made by an occupant.

6. The control device for the motor-driven 4WD vehicle according to claim 1, wherein
    the first electric power is AC power, the second electric power is DC power, and wherein
    the single step-up and step-down inverter converts AC power which is generated by the motor-generator to DC power that is charged to the battery.

7. The control device for the motor-driven 4WD vehicle according to claim 2, wherein
    the motor includes a DC motor,
    the first electric power is AC power, and
    the control device further comprising a rectifier rectifying AC power which is generated by the motor-generator to fifth DC power with a fifth rated voltage by which the motor is driven.

8. The control device for the motor-driven 4WD vehicle according to claim 2, further comprising:

a switch connected between the battery and a neutral point of the motor-generator and operative to be open when the first rated voltage of the first electric power generated by the motor-generator exceeds a given voltage value.

9. The control device for the motor-driven 4WD vehicle according to claim 2, wherein the battery is charged with the second electric power which is stepped down from the first electric power generated by the motor-generator and when the motor remains inoperative, the first rated voltage which is an output voltage of the motor-generator is maintained at a voltage value lower than that of the maximum power output generated by the motor-generator.

10. A method of controlling a motor-driven 4WD vehicle wherein either one of front wheels or rear wheels are driven by an engine and the others are driven by a motor depending upon needs, the method comprising:

causing a single step-up and step-down inverter to rectify and step down a first electric power with a first rated voltage generated by a motor-generator to a second electric power with a second rated voltage lower than the first rated voltage for supplying the second electric power to an electric equipment mounted on a vehicle; and causing the single step-up and step-down inverter to step up a third electric power with a third rated voltage generated by the electric equipment to a fourth electric power with a fourth rated voltage higher than the third rated voltage and convert the first electric power to a fifth electric power with a fifth rated voltage thereby supplying the fifth electric power to the motor to perform 4WD drive.

11. A control device for a motor-driven 4WD vehicle wherein either one of front wheels or rear wheels are driven by an engine and the others are driven by a motor depending upon needs, comprising:

generating means which is driven by the engine to generate a first electric power with a first rated voltage;

single step-up and step-down inverting means for stepping down the first electric power to a second electric power with a second rated voltage lower than the first rated voltage; and an electrical equipment supplied with the second electric power outputted from the single step-up and step-down inverting means, the electrical equipment including a battery, wherein the motor is driven with the first electric power with the first rated voltage outputted from the generating means, the single step-up and step-down inverting means has a first function to cause the first electric power to be stepped down to the second electric power and a second function to cause a third electric power with a third rated voltage which is discharged from the battery to be stepped up to a fourth electric power with a fourth rated voltage higher than the third rated voltage.

* * * * *